United States Patent Office 3,826,820
Patented July 30, 1974

3,826,820
PREPARATION OF NON-SOLVATED CRYSTAL-
LINE ALPHA-ALUMINUM HYDRIDE
Charles B. Roberts and Frank M. Brower, Midland, Mich.,
assignors to The Dow Chemical Company, Midland,
Mich.
No Drawing. Filed Oct. 18, 1965, Ser. No. 500,489
Int. Cl. C01b 6/00
U.S. Cl. 423—645                                 3 Claims

ABSTRACT OF THE DISCLOSURE

This invention is to a process of preparing non-solvated crystalline alpha-aluminum hydride by refluxing aluminum hydride-trimethyl amine, precipitating and separating the formed tri(aluminum hydride)-trimethylamine adduct and heating said adduct at a maximum temperature of about 85° C. to produce said aluminum hydride. Aluminum hydride is useful as a fuel component in solid and hybrid rocket propellant systems.

---

This invention is related to light metal hydrides and more particularly is concerned with a novel process for preparing a substantially non-solvated crystalline aluminum hydride.

Certain crystal forms of non-solvated aluminum hydride have been found to be suitable for use as a fuel component in solid and hybrid rocket propellant systems. One form of crystalline non-solvated aluminum hydride hereinafter referred to as "alpha-aluminum hydride" or "α-aluminum hydride" particularly suitable for use in such applications has a hexagonal crystal structure with unit cell dimensions of $a=4.44\pm.02$ A., $c=5.89\pm.02$ A. The density of this hexagonal aluminum hydride is greater than 1.4 grams per cubic centimeter. It is substantially insoluble in diethyl ether but is soluble in tetrahydrofuran. It is relatively inert to hydrazine and hydrolyzes slowly in the presence of water. The characteristic X-ray powder diffraction pattern for this crystalline aluminum hydride corresponds to the following wherein "d" represents the interplanar spacings of the planes in Angstrons based upon Miller indices and "I/I" is the relative line intensity compared to the strongest line based at 100.

| $d$:   | $I/I$ |
|--------|-------|
| 3.85   | 10    |
| 3.22   | 100   |
| 2.34   | 25    |
| 2.22   | 19    |
| 1.965  | 4     |
| 1.825  | 11    |
| 1.607  | 11    |
| 1.469  | 17    |
| 1.410  | 11    |
| 1.374  | 6     |
| 1.300  | 7     |
| 1.280  | 4     |
| 1.166  | 2     |
| 1.126  | 2     |
| 1.110  | 2     |
| 1.072  | 3     |
| 1.048  | 3     |
| 1.034  | 3     |
| 1.002  | 3     |
| 0.982  | 0.5   |
| 0.965  | 2     |
| 0.948  | 1     |
| 0.914  | 2     |
| 0.897  | 1     |
| 0.871  | 1.5   |
| 0.863  | 1.5   |
| 0.843  | 1.5   |
| 0.837  | 1.5   |

The present invention is to a novel process for preparing alpha-aluminum hydride wherein an aluminum hydride-trimethylamine adduct $(AlH_3 \cdot N(CH_3)_3)$ is refluxed thereby partially removing trimethylamine and forming the novel compound tri(aluminum hydride)-trimethylamine adduct corresponding to the formula $$[(AlH_3)_3 \cdot N(CH_3)_3].$$

The latter compound is treated under specific and predetermined conditions of temperature and reduced pressure to produce alpha-aluminum hydride.

More particularly in accordance with the present process aluminum hydride-trimethylamine adduct is heated to a temperature between its boiling point, i.e. about 76° C. at atmospheric pressure, and about 85° C. The resulting liquid is refluxed at a maximum pressure of about 50 milliliters mercury absolute whereupon the novel compound tri(aluminum hydride)-trimethylamine adduct $[(AlH_3)_3 \cdot N(CH_3)_3]$ forms in the reaction mass as a white crystalline solid. This compound has a unique X-ray diffraction pattern and a unique infrared and Raman spectrum differing from that exhibited by aluminum hydride-trimethylamine adduct. The solid crystalline tri (aluminum hydride)-trimethylamine adduct is heated at a temperature of about 80 to about 85° C. at a maximum pressure of about 10 microns mercury to provide a product containing appreciable quantities of crystalline alpha-aluminum hydride. Preferably this treatment is carried out at the lowest pressure possible, e.g. 1 micron mercury absolute or less. The aluminum hydride can be recovered from the product mass.

The aluminum hydride-trimethylamine adduct ordinarily is made by reacting lithium aluminum hydride and trimethylamine hydrochloride in an inert liquid organic carrier which is a solvent for aluminum hydride-trimethylamine adduct, e.g. benzene, at or slightly above room temperature. Lithium chloride precipitates in the reaction mass. This readily can be separated therefrom leaving a solution of the aluminum hydride-trimethylamine adduct in benzene. The benzene is removed, as by evaporation under a partial vacuum, leaving the solid aluminum hydride-trimethylamine adduct. This product can be utilized in the practice of the present process as produced or, prior to use, can be purified by sublimation at about 45° C. under a reduced pressure, e.g. about 1 micron mercury absolute. In preparing the aluminum hydride-trimethylamine adduct, at a minimum, about stoichiometric quantities of the reactants are employed. For optimum in product purity, an excess of from about 15 to 20 weight percent lithium aluminum hydride over that required stoichiometrically for reaction with the trimethylamine hydrochloride to prepare aluminum hydride-trimethylamine adduct is used.

For optimum yields and highest product purity all operations are carried out in an inert atmosphere which is substantially moisture free, e.g. dry nitrogen or argon.

The following Example will serve to further illustrate the present invention but is not meant to limit it thereto.

EXAMPLE

About 9 grams of lithium aluminum hydride was slurried in about 300 cubic centimeters of benzene in a 500 milliliter flask at about room temperature under a substantially anhydrous inert atmosphere. About 19.2 grams of trimethylamine hydrochloride rapidly was added to this slurry with stirring. During this addition, the temperature of the reaction mass rose to about 50° C. The resulting product mixture was allowed to stand for about one hour after the completion of the trimethylamine hydrochloride addition and the lithium chloride which had been precipitated therein was removed by filtration. The benzene liquid carrier was removed from the product solution at a reduced pressure leaving a solid product of aluminum hydride-trimethylamine adduct. The yield of this product was about 80 percent. This product was recovered in high purity form by sublimation at about 45° and a pressure of about 1 micron mercury absolute.

The Raman spectrum of the aluminum hydride-trimethylamine adduct is as follows:

| Wave No. | Intensity |
|---|---|
| 2291 | med. w. |
| 2969 | m.w. |
| 2926 | m.w. |
| 2905 | m.w. |
| 2846 | m.w. |
| 2777 | w. |
| 1795 | v.s. |
| 1473 | w. |
| 1441 | med. |
| 1399 | v.w. |
| 1248 | v.w. |
| 1098 | v.w. |
| 1000 | med. |
| 891 | s. |
| 743 | v. w. |
| 663 | v. w. |

This material exhibited an infrared absorption spectrum having absorption bands or peaks at about 640 cm.$^{-1}$, 730 cm.$^{-1}$, 1000 cm.$^{-1}$, 1095 cm.$^{-1}$, 1220 cm.$^{-1}$, 1245 cm.$^{-1}$, 1340 cm.$^{-1}$, 1410 cm.$^{-1}$, 1450 cm.$^{-1}$, 1480 cm.$^{-1}$, 1760 cm.$^{-1}$ and a rather broad band at 1820 to 1830 cm.$^{-1}$.

The resulting aluminum hydride-trimethylamine adduct was heated in a bath to a temperature of about 85° at atmospheric pressure at which temperature it was a clear, low viscosity liquid. While in this state, the pressure on the system was reduced to about 25–30 millimeters mermury absolute and the liquid mass refluxed at this pressure and at about 85° C. for a period of from about 20 to 30 minutes. During this period, a white solid separated from the liquid reaction mass. Following the refluxing period, the pressure in the flask was lowered to about 1 micron mercury absolute thereby quickly removing any residual aluminum hydride trimethylamine adduct. Following removal of the aluminum hydride-trimethylamine adduct, the bath temperature was rapidly lowered to about 60° C., the pressure in the reaction vessel being maintained at about 1 micron for about 30 minutes thereby assuring substantially complete removal of all volatile materials. The resulting product was a white crystalline solid.

This material decomposed rapidly at 135° C. but did not melt and was insoluble in diethyl ether and benzene.

Elemental analysis of this material gave aluminum—52 percent, carbon—25.5 percent, hydrogen—10.8 percent, nitrogen—9.4 percent. Theoretical analysis for tri(aluminum hydride)-trimethylamine adduct

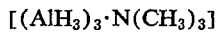

[(AlH$_3$)$_3$·N(CH$_3$)$_3$]

is aluminum—54.3 percent, carbon—22.1 percent, hydrogen—10.9 percent, nitrogen—9.4 percent.

Infrared spectrum of this material indicated absorption bands and peaks at about 605 cm.$^{-1}$, 710 cm.$^{-1}$, 820 cm.$^{-1}$, 990 cm.$^{-1}$, 1020 cm.$^{-1}$, 1100 cm.$^{-1}$, 1240 cm.$^{-1}$, 1460 cm.$^{-1}$, 1480 cm.$^{-1}$, and a broad band extending from 1580–1620 cm.$^{-1}$.

The X-ray diffraction pattern of this material was as follows:

| d (hkl): | I/Io |
|---|---|
| 9.75 | 100 |
| 6.51 | 10 |
| 5.63 | 10 |
| 5.00 | 10 |
| 4.65 | 75 |
| 4.34 | 15 |
| 3.84 | 40 |
| 3.51 | 10 |
| 3.39 | 18 |
| 3.21 | 10 |
| 2.92 | 40 |
| 2.80 | 30 |
| 2.57 | 4 |
| 2.40 | 2 |
| 2.23 | 25 |
| 1.94 | 4 |
| 1.90 | 4 |
| 1.88 | 4 |
| 1.85 | 3 |
| 1.82 | 3 |
| 1.62 | 2 |
| 1.55 | 6 |
| 1.52 | 2 |
| 1.50 | 6 |

A Raman spectra for the tri(aluminum hydride)-trimehylamine adduct was as follows:

| Wave No.: | Intensity |
|---|---|
| 1076 | med. |
| 983 | v.w. |
| 819 | v.w. |
| 675 | v.w. |
| 542 | v.w. |

The tri(aluminum hydride)-trimethylamine adduct was heated at a temperature of about 80° and an initial pressure of about 1 micron mercury absolute for about 3½ hours. During this period, the pressure in the system increased gradually to a maximum of about 10 microns.

X-ray diffraction analysis of the resulting product indicated production of alpha-aluminum hydride in a yield of from about 10 to 20 percent.

Various modifications can be made in the process of the present invention without departing from the spirit or scope thereof for it is understood that we limit ourselves only as defined in the appended claims.

We claim:

1. A process for preparing a non-solvated crystalline alpha-aluminum hydride which comprises;
   (a) providing aluminum hydride-trimethylamine adduct and refluxing said aluminum hydride-trimethylamine adduct at a maximum temperature of about 85° C. and a maximum absolute pressure of about 50 millimeters mercury thereby to precipitate solid tri(aluminum hydride)-trimethylamine adduct in the reaction mass,
   (b) separating said tri(aluminum hydride)-trimethylamine adduct from residual aluminum hydride-trimethylamine adduct,
   (c) heating said tri(aluminum hydride)-trimethylamine adduct at a maximum temperature of about 85° C. and an initial pressure of about 1 micron mercury absolute, and
   (d) recovering crystalline, non-solvated alpha-aluminum hydride.

2. The process as defined in Claim 1 and including the initial steps of
   (a) mixing lithium aluminum hydride and trimethylamine hydrochloride in an inert liquid organic carrier which is a solvent for aluminum hydride-trimethylamine adduct thereby to prepare said aluminum hydride-trimethylamine adduct, the amount of said lithium aluminum hydride to said trimethylamine hydrochloride ranging from about stoichiometric to about 20 weight percent excess of said lithium aluminum hydride over that required stoichiometrically for preparation of said aluminum hydride-trimethylamine adduct, and (b) recovering said aluminum hydride-trimethylamine adduct.

3. The process as defined in Claim 1 wherein the aluminum hydride-trimethylamine adduct is refluxed at about 85° C. at a pressure of from about 25 to about 30 millimeters mercury absolute for a period from about 20 to about 30 minutes thereby preparing tri(aluminum hydride)-trimethylamine adduct and said tri(aluminum hydride)-trimethylamine adduct is heated at a temperature of about 80° C. at an initial pressure of about 1 micron mercury absolute for about 3.5 hours while maintaining the absolute pressure of the system at a maximum of about 10 microns mercury absolute.

References Cited

Emeleus et al.: Advances in Inorganic Chemistry, vol. 8, 1966, Academic Press, New York, p. 283.

Hoffman: LMSD–703150, Aluminum Hydride, A Literature Review, August 1960, pp. 3–5 and 17–19.

Ruff et al.: J. Am. Chem. Soc., vol. 82, 1960, pp. 2141–2144.

LELAND A. SEBASTIAN, Primary Examiner

U.S. Cl. X.R.

149—109; 260—448 R